INVENTORS
KARL BOFINGER
WALTER THOMAS HAKE

INVENTORS
KARL BOFINGER
WALTER THOMAS HAKE
BY
*Leonard R. Kohan*
ATTORNEY

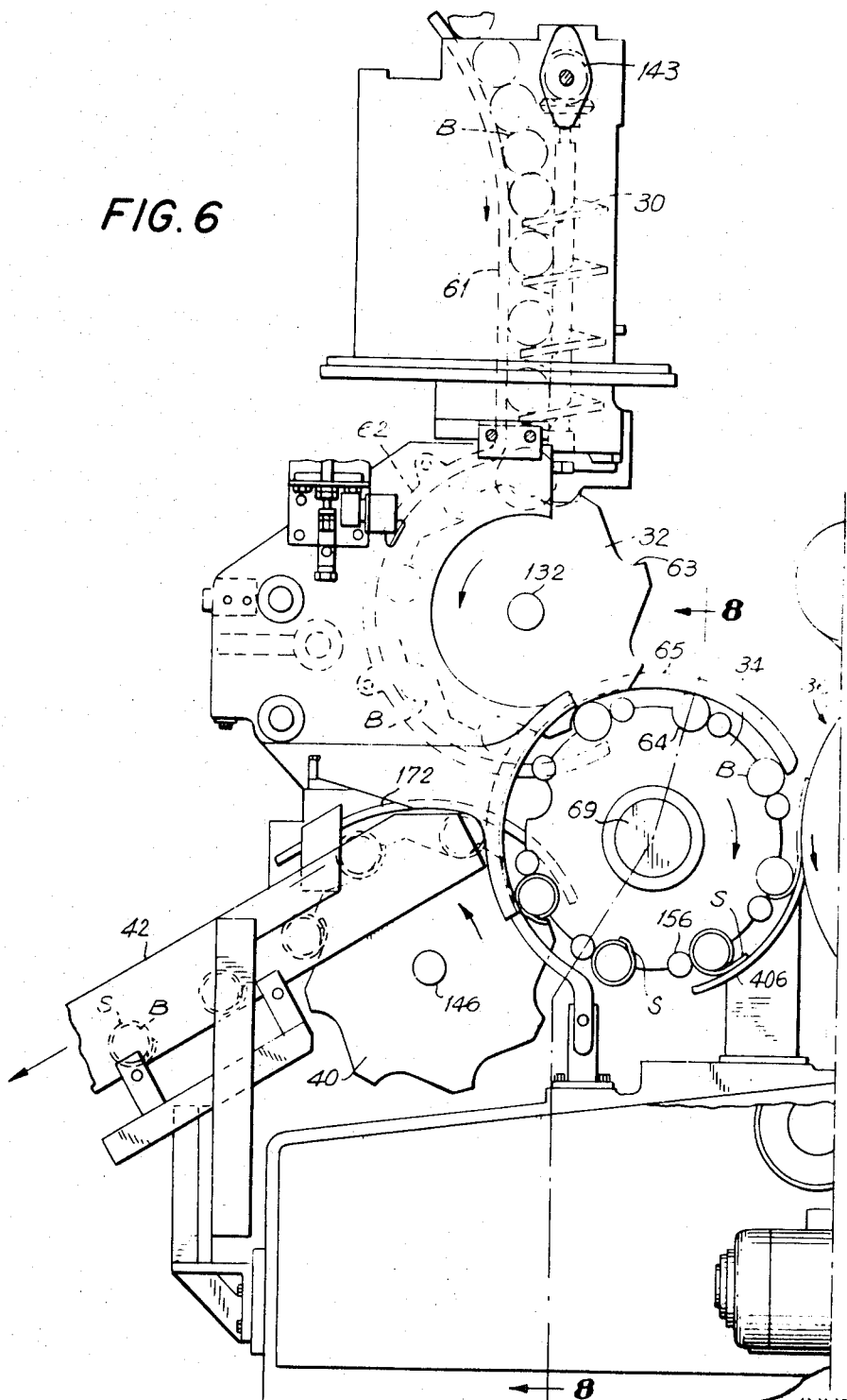

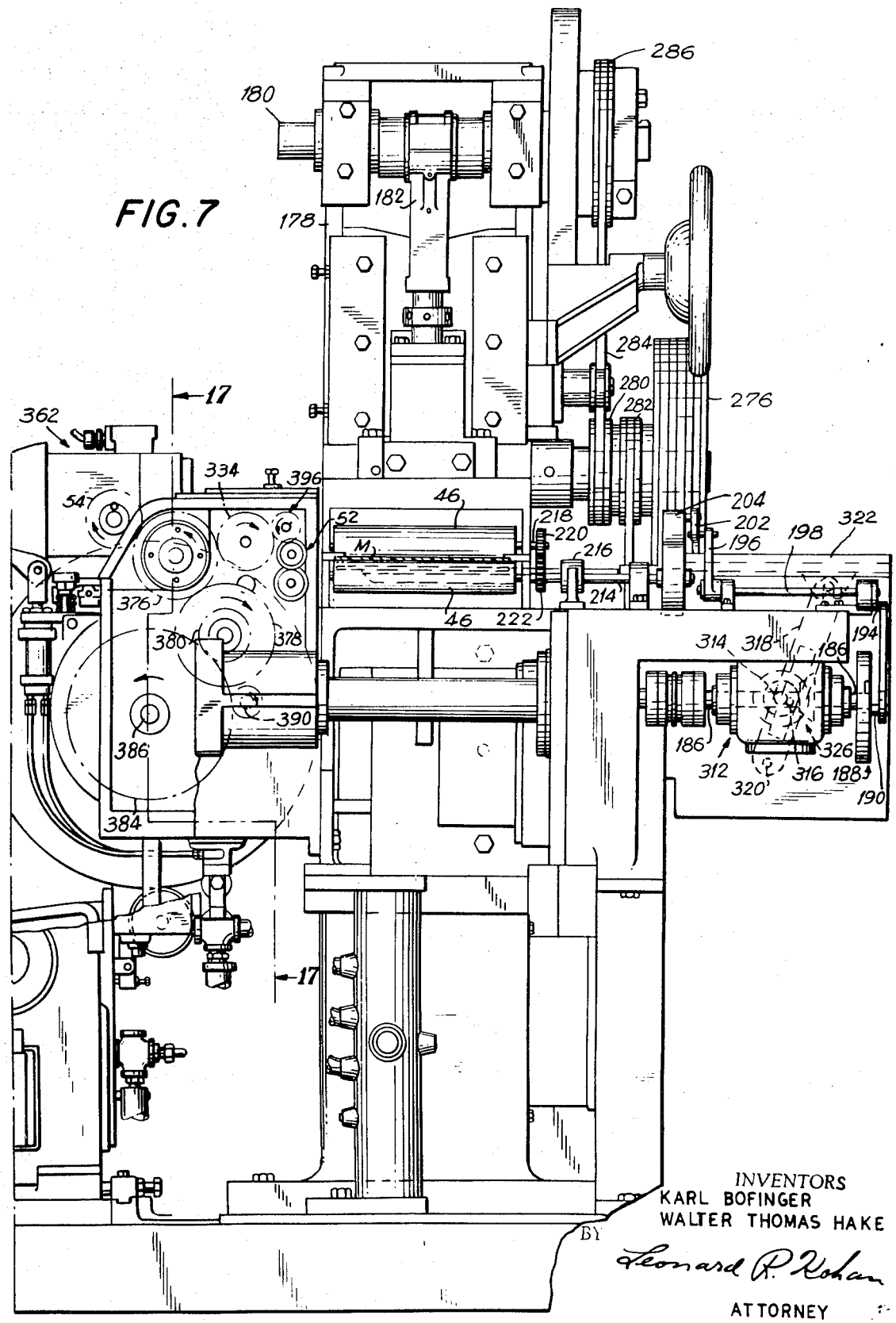

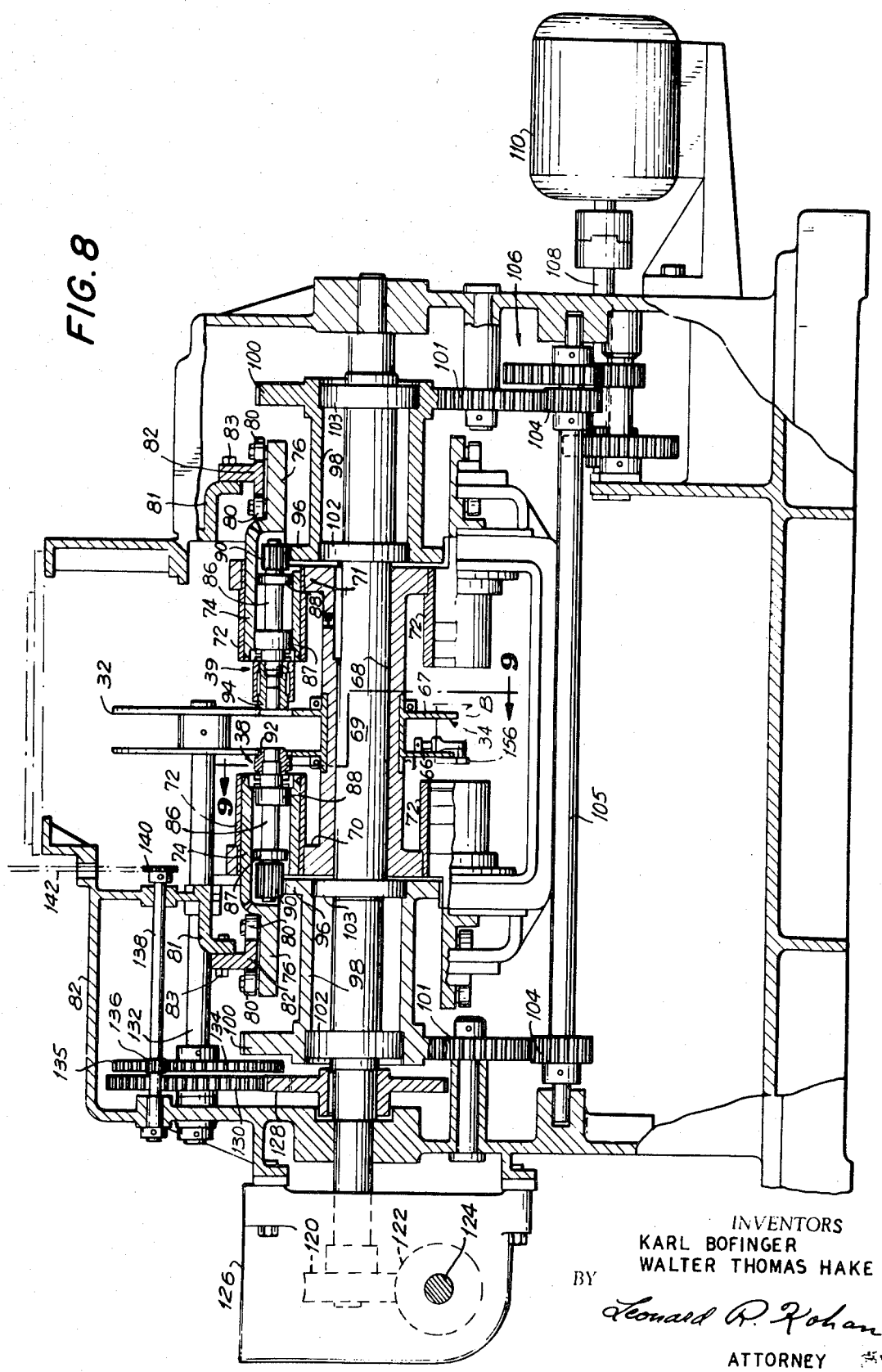

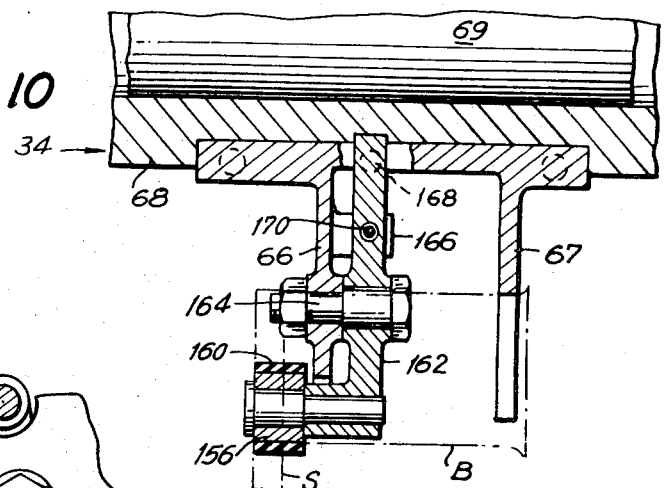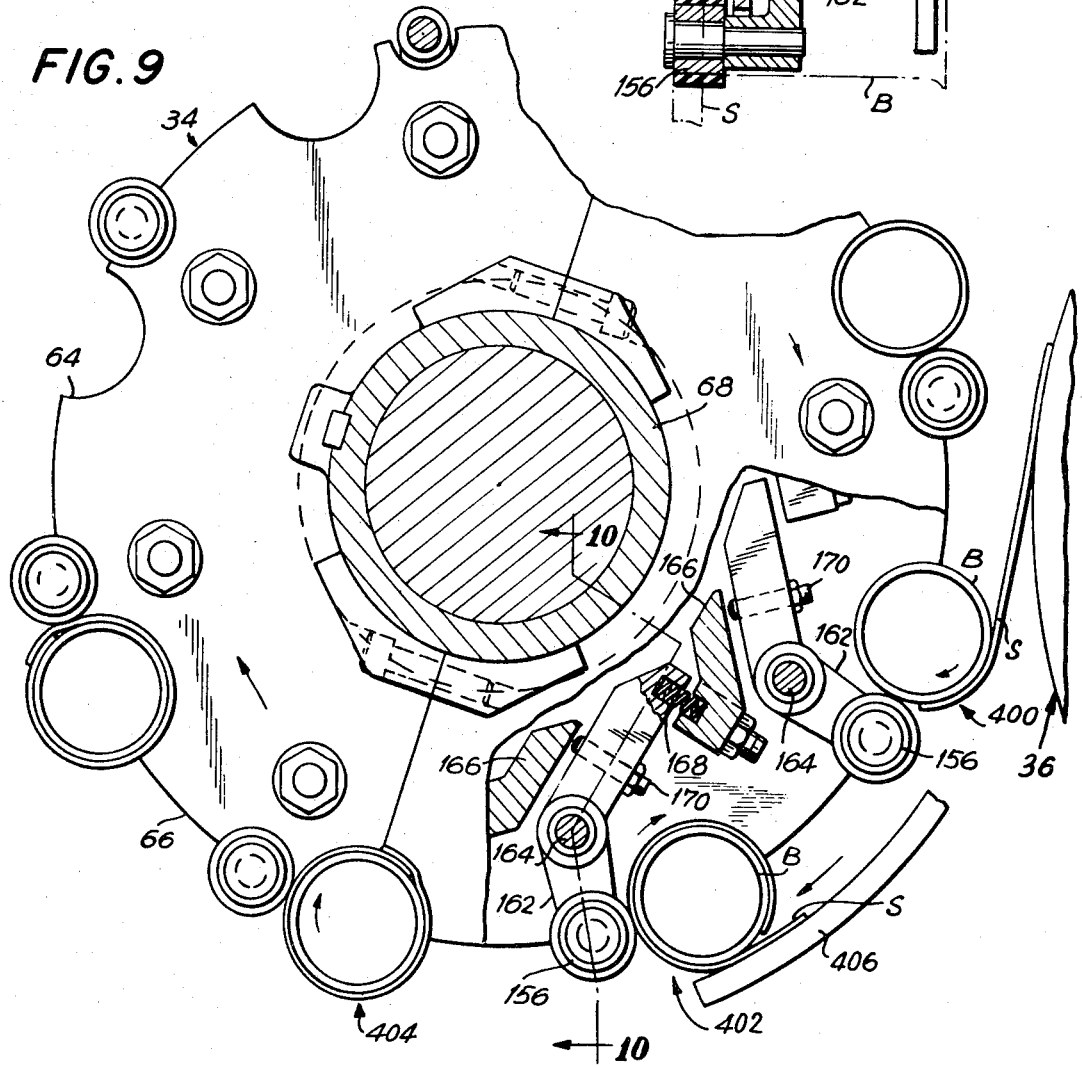

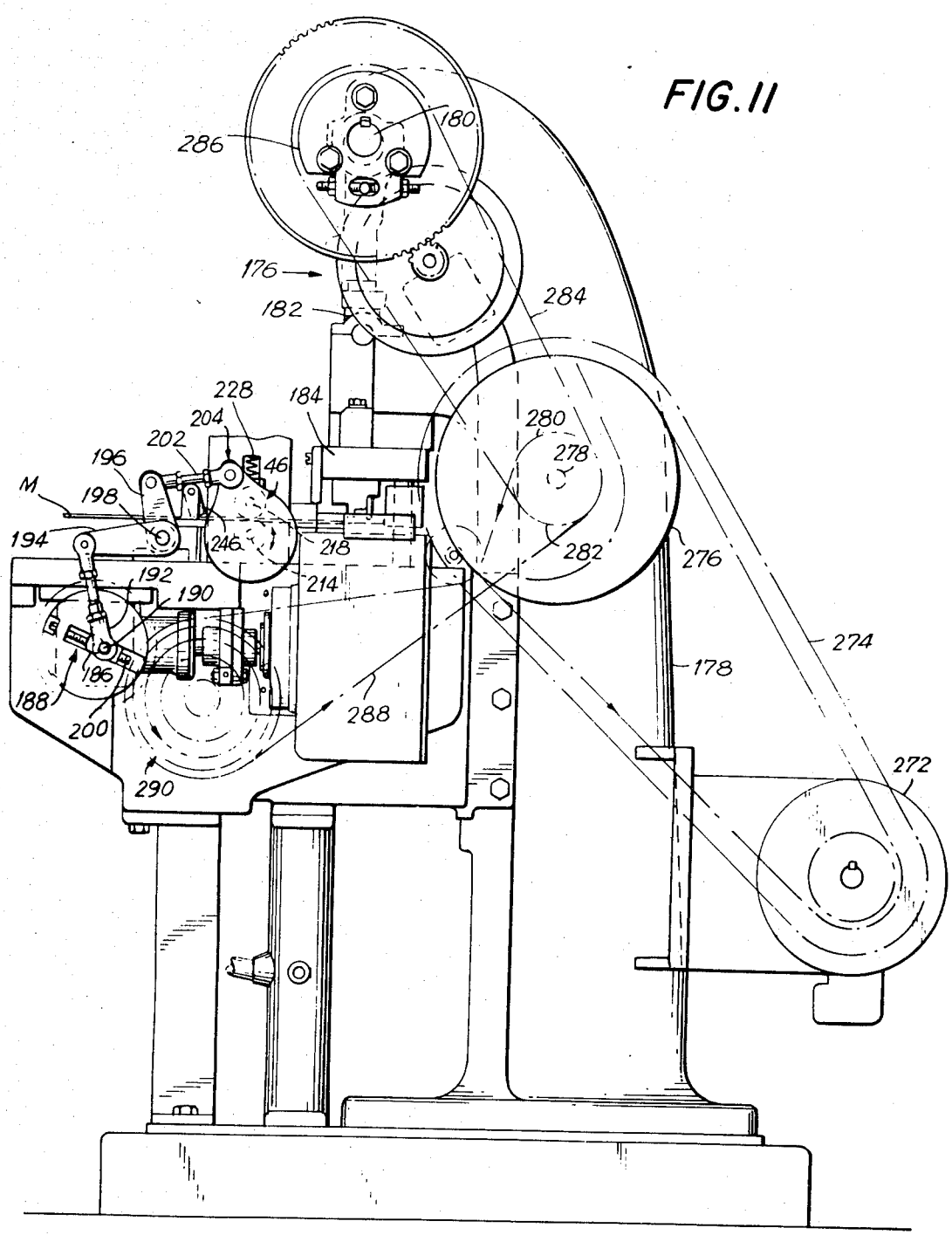

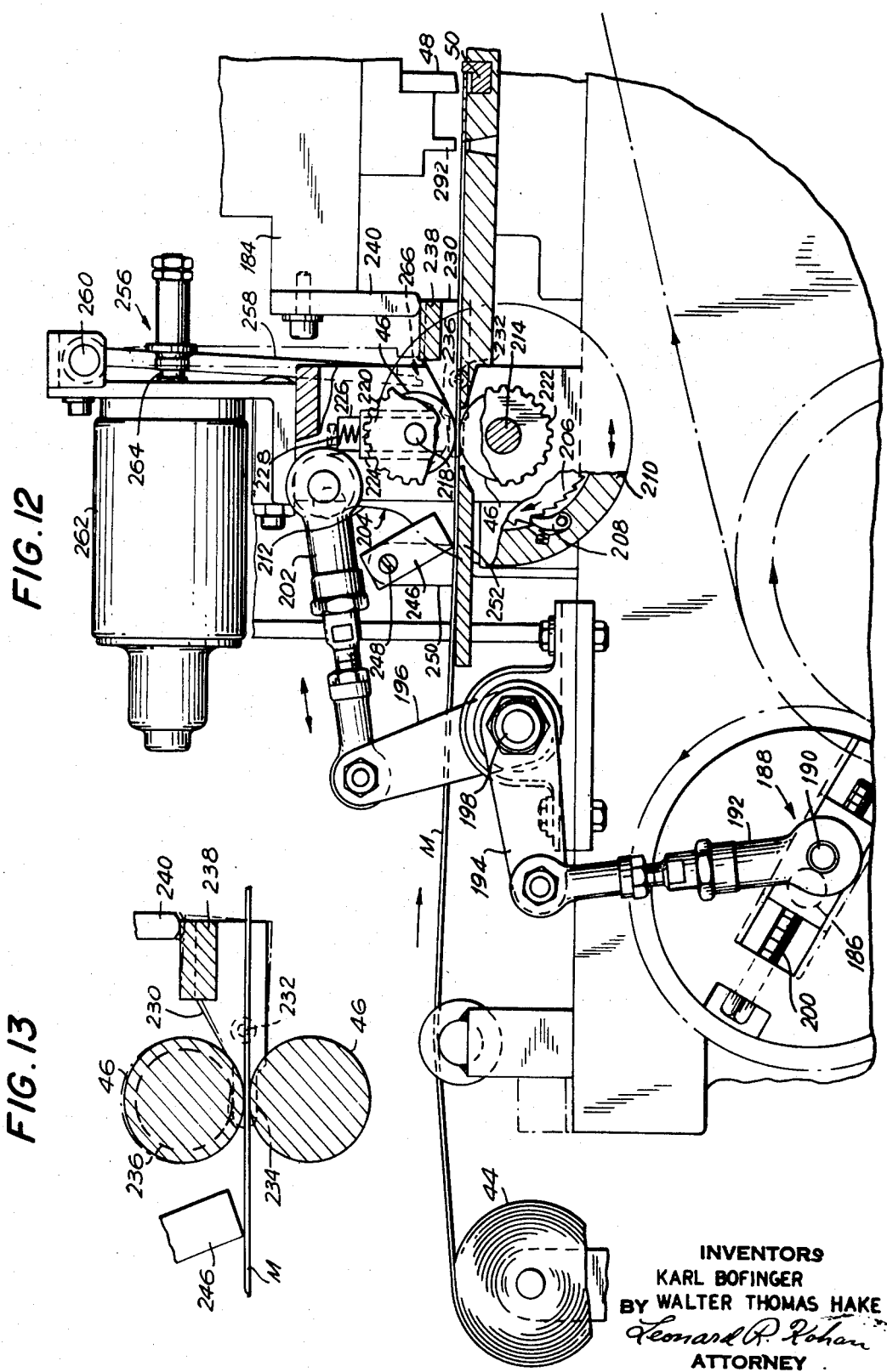

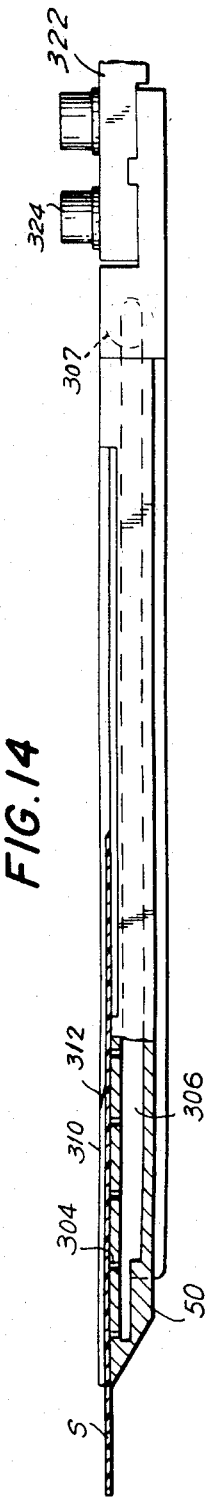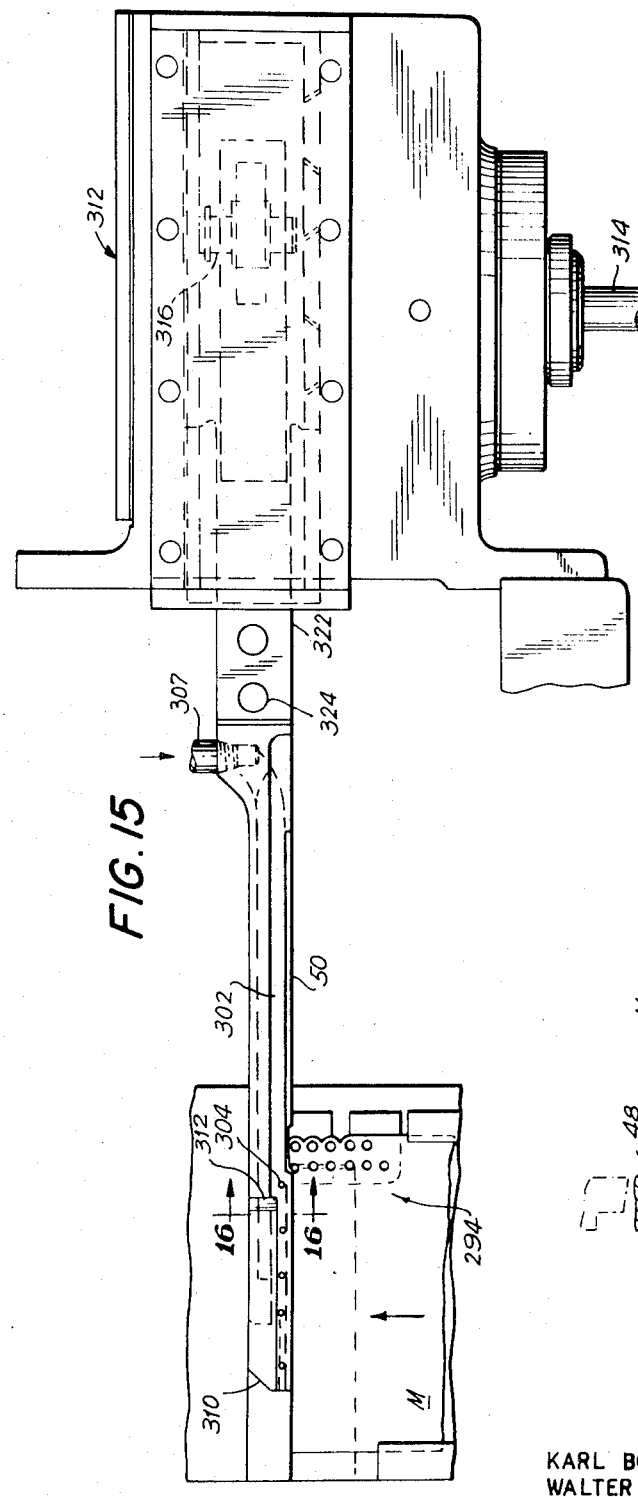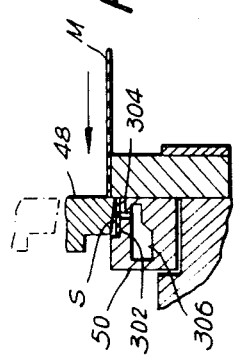

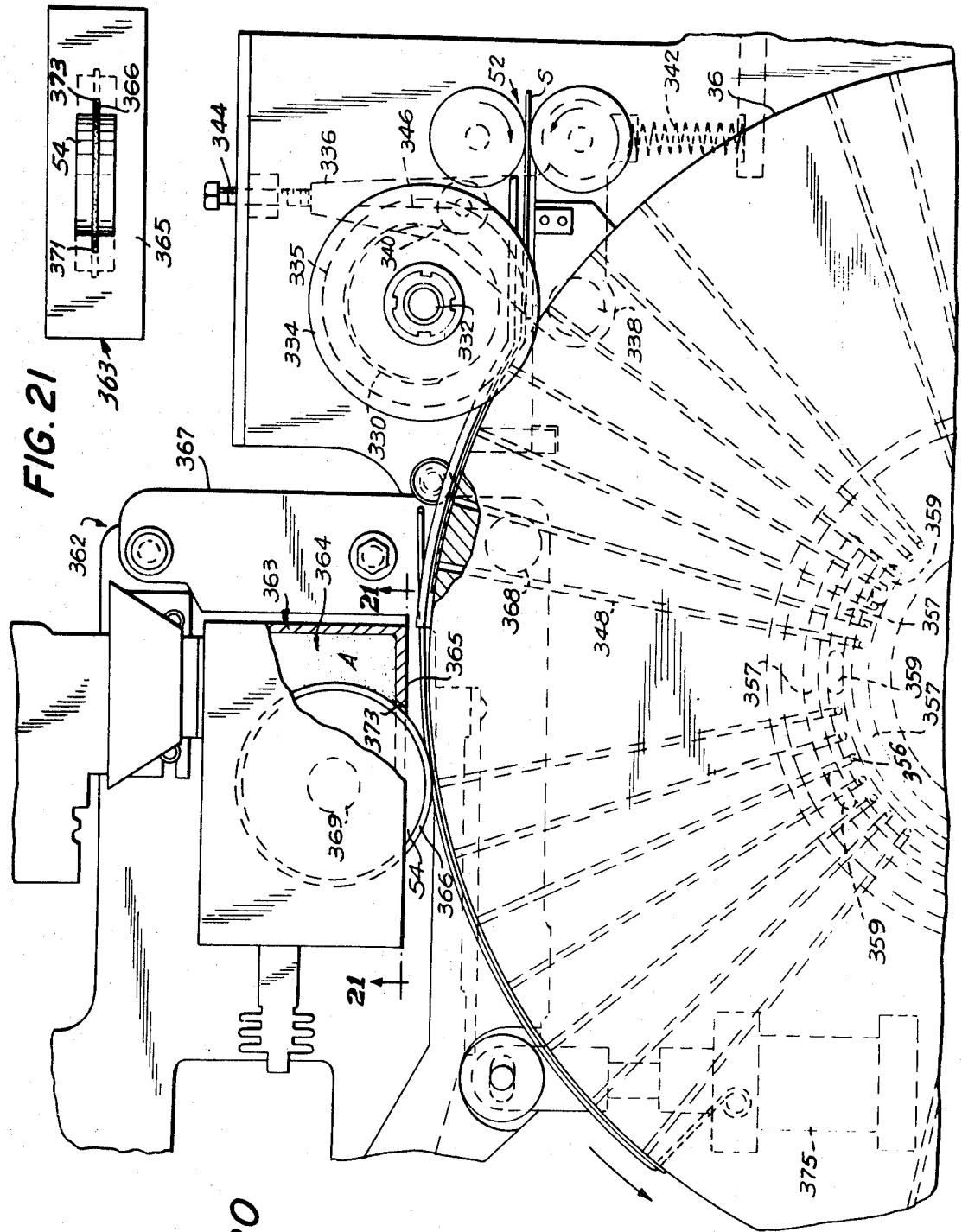

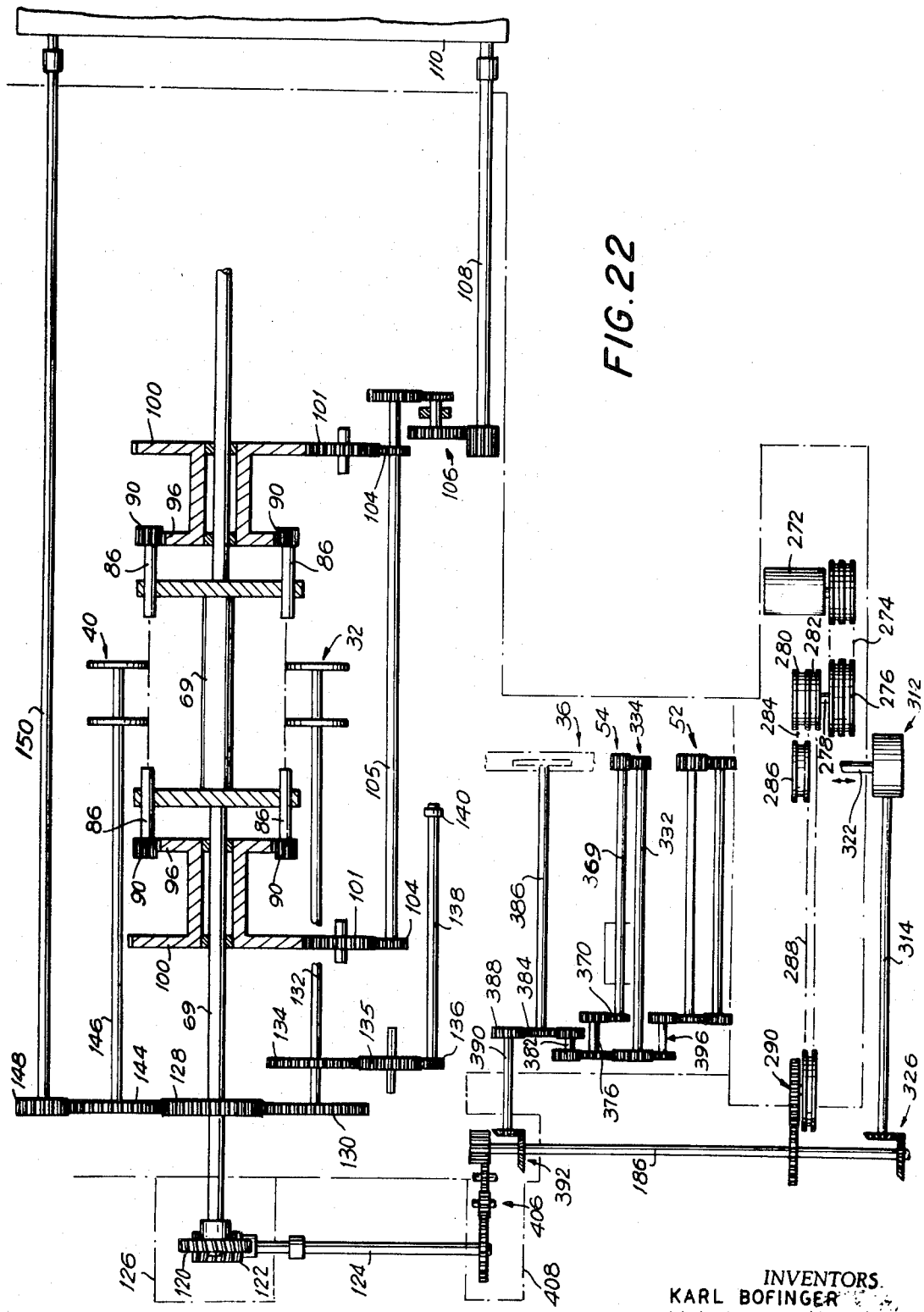

United States Patent Office 3,690,997
Patented Sept. 12, 1972

3,690,997
APPARATUS FOR SECURING STRIP MEMBERS TO CONTAINER BODIES
Karl Bofinger, Cincinnati, Ohio, and Walter Thomas Hake, Wyckoff, N.J., assignors to American Can Company, New York, N.Y.
Original application Nov. 21, 1966, Ser. No. 595,809, now Patent No. 3,598,675, dated Aug. 10, 1971. Divided and this application Sept. 22, 1970, Ser. No. 74,402
Int. Cl. B65c 3/12, 9/02
U.S. Cl. 156—567
18 Claims

ABSTRACT OF THE DISCLOSURE

An apparatus for adhesively securing a seamed release strip to the marginal end portion of a tubular container wherein the strip is moved along a circular path of revolution and simultaneously with the movement of the strip, the container, rotating about its own axis, is moved in a circular path of revolution tangential to the strip's path and axially aligned therewith so that a lateral edge of the strip is in substantial alignment with the marginal end portion of the container. An adhesive is applied to either the strip or the container in order that one will adhere to the other upon contact. The leading portion of the strip contacts the marginal end portion of the rotating container and is adhered thereto. The container movement and rotation subsequent to the contacting causes the strip to leave its path of revolution and the remaining portion of the strip to adhere around the marginal end portion of the container. The length of the strip exceeds the circumference of the container causing a trailing portion of the strip to overlap the leading portion upon adherence of the strip to the marginal end portion of the container. The strip is then pressed against the container causing more intimate contact therewith.

This application is a division of co-pending application Ser. No. 595,809, filed Nov. 21, 1966, now U.S. Pat. No. 3,598,675, issued Aug. 10, 1971.

This invention relates to an apparatus and method for applying strips or tapes to container bodies or the like.

Although the invention may be utilized in applying a strip or tape of any desired type to any suitable container-like body, it is particularly adaptable for applying to container bodies plastic seam release strips which are adapted to be stripped from the sealed container to provide an easy opening feature. In such containers, a tubular container body, which may be of any suitable type as, for example, a spirally wound body comprising a plurality of fibreboard body plies and a label ply made of aluminum foil or a coated paper, has a pull-out or seam release strip applied to the outside wall surface of the body adjacent one end of the latter. The strip is positioned on the body so that an edge portion of the strip is adapted to be mechanically enclosed within the end seam securing the end closure or cover to the end of the container body which carries the strip. Thus, when a pull tab which is provided on the strip is manually grasped and pulled, the strip is peeled off the body and the strip edge within the end seam is withdrawn from the end seam as the strip is removed in one piece to thereby loosen the securement of the end closure to the body for easy separation thereof.

The present invention relates to a machine and method for adhesively securing the seam release strip to the container body preparatory to the application of the end closure thereto.

An object of the present invention is to provide a method and apparatus for applying strip or tape to the outside of a container body or the like.

Another object is to provide for handling container bodies and forming individual strips from a supply web and manipulating them in a coordinated manner so that the strips are applied to the container bodies.

A further object is to provide a method and apparatus for applying seam release strips or the like to container bodies at relatively high speeds commensurate with the economics of present day mass production practices.

A further object is to provide certain improvements in the form, construction, arrangement and material of the several elements whereby the above-named and other objects may effectively be attained.

The aforesaid objects of the present invention and other objects which will become apparent as the description proceeds are achieved by moving container bodies along a fixed path while simultaneously rotating individual bodies about their own axes. Strips to be applied to the container bodies are transversely sheared from web stock and moved along another path, during which movement a strip of a tacky adhesive is applied. These operations are arranged and coordinated so that successively formed strips are brought into contact with successive rotating bodies whereby upon contact, each body picks up a strip and the latter is wrapped around the body and pressed into intimate contact therewith so that it remains adhesively secured to the body when the latter is discharged from the machine.

For a better understanding of the present invention, reference should be had to the accompanying drawings wherein like numerals of reference indicate similar parts throughout the several views and wherein:

FIG. 6 is an elevational view looking substantially along the line 6—6 of FIG. 3 and showing the body handling section of the machine including the body feed, applicator, and discharge turrets.

FIG. 7 is an elevational view looking substantially along the line 7—7 of FIG. 3 and showing the strip forming and handling section of the machine including the vacuum wheel for advancing the strip, together with portions of the strip cutting and feeding apparatus.

FIG. 8 is a sectional view taken substantially along the line 8—8 of FIG. 6.

FIG. 9 is a sectional view of the applicator turret taken substantially along the line 9—9 in FIG. 8.

FIG. 10 is a sectional view, parts of which have been broken away, taken substantially along the line 10—10 of FIG. 9.

FIG. 11 is a partial elevational view of the strip feed and cutting portion of the machine, parts of which are not shown for the sake of clarity, as seen from the right in FIG. 7.

FIG. 12 is a partial view on a scale larger than that of FIG. 11 of elements of the web feed and strip-cutting apparatus.

FIG. 13 is a fragmentary enlarged sectional detail of the feed rolls and certain associated elements shown in FIG. 12.

FIG. 14 is an elevational view of the strip transfer bar for transferring the formed strip to the pinch rolls and vacuum wheel.

FIG. 15 is a plan view of the transfer bar, but on a smaller scale than that shown in FIG. 14, and also showing the operating mechanism therefor.

FIG. 16 is an enlarged sectional detail through the transfer bar taken substantially along the line 16—16 of FIG. 15.

FIG. 20 is a partial elevational view of the upper portion of the vacuum wheel showing the adhesive applicator, the hold-down roll, and the pinch rolls, parts of which are broken away and in section and parts of which are not shown for the sake of clarity.

FIG. 21 is a partial bottom view of the adhesive applicator looking substantially along the line 21—21 of FIG. 20.

FIG. 22 is a schematic representation of the drive for the various operating mechanisms of the machine.

Figure 1:
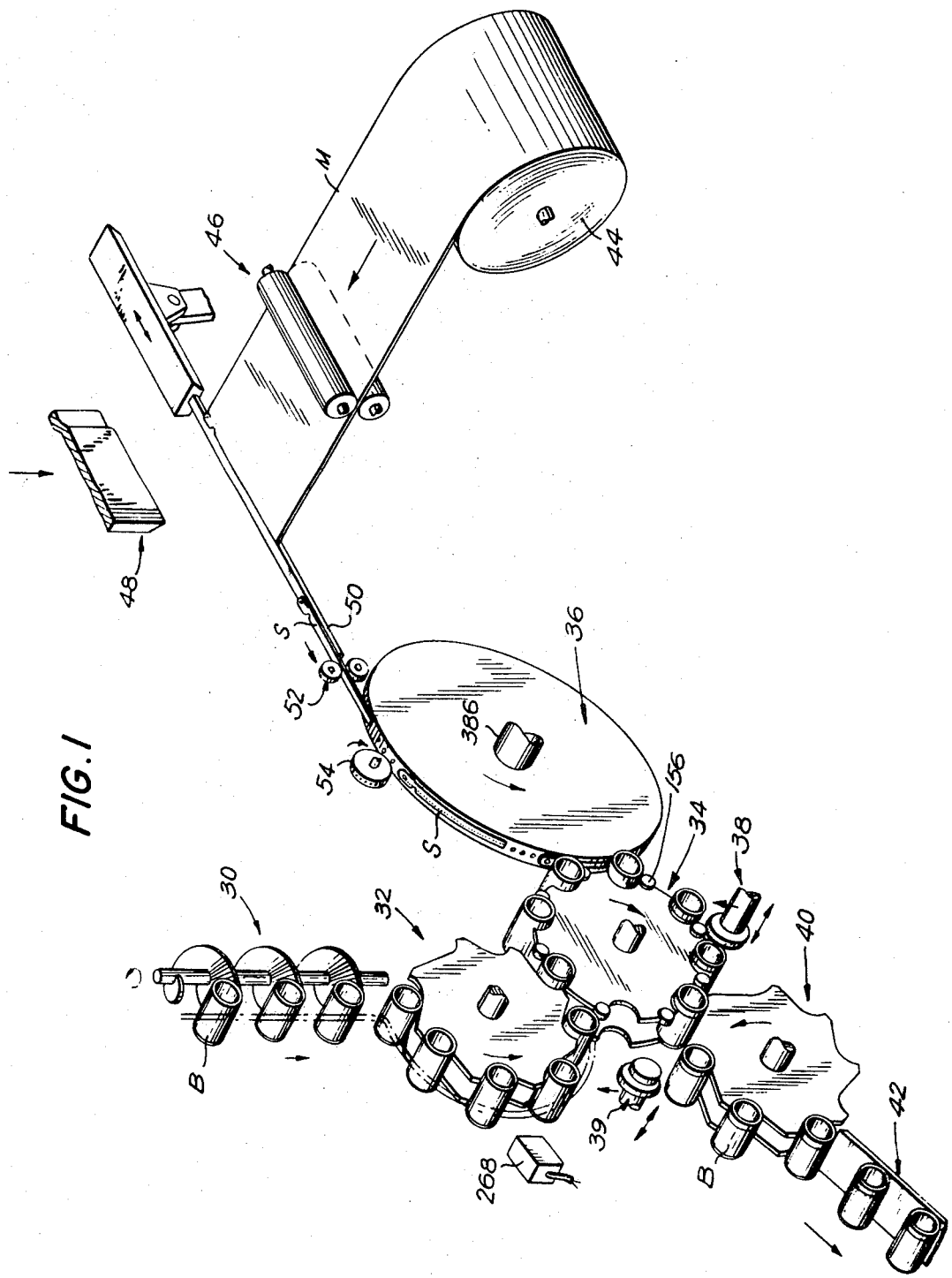
FIG. 1 is a schematic and perspective view of a strip forming and applying apparatus constructed and arranged according to one embodiment of the invention and showing the paths of the container bodies and of the formed strips which are applied thereto.

Referring to the drawings, FIG. 1 represents schematically the mechanisms for advancing tubular container bodies B and for cutting and feeding individual strips S and applying the latter to the container bodies. The bodies B are fed vertically downwardly by a spiral feed worm conveyor 30 to a rotary feed turret 32. The feed turret 32 carries the bodies to a position where they are transferred onto a strip applicator turret 34, the latter rotating adjacent a vacuum wheel 36 onto the periphery of which strips S have been applied. Spindle assemblies 38, 39, which engage the ends of the bodies B, rotate the container bodies as they are carried on the applicator turret 34, and the rotating bodies B are brought into contact with and pick the strips S up off the vacuum wheel 36 and wrap them around their outer surfaces. Thereafter the bodies B, each with a strip S wrapped therearound, are transferred to a discharge turret 40, and from there to a discharge chute 42.

The plastic web material M for the strips S is initially supplied from a coil 44 and fed by a pair of intermittently operating feed rollers 46 to a press which includes a reciprocating cutting member 48 which cuts off end portions of the web M to form the strips S. A reciprocating transfer bar 50, underlying the cutting member 48, receives each cut strip S and feeds it laterally to pinch rolls 52 which, in turn, feed the strip to the vacuum wheel 36 where a suitable adhesive is applied by an adhesive roll 54. The wheel 36 ultimately carries the strip S into contact with a container body B which picks it off the wheel 36 as previously described.

The apparatus shown schematically in FIG. 1 is incorporated in a specific embodiment of a strip-applying machine shown in the other figures.

Figure 2:
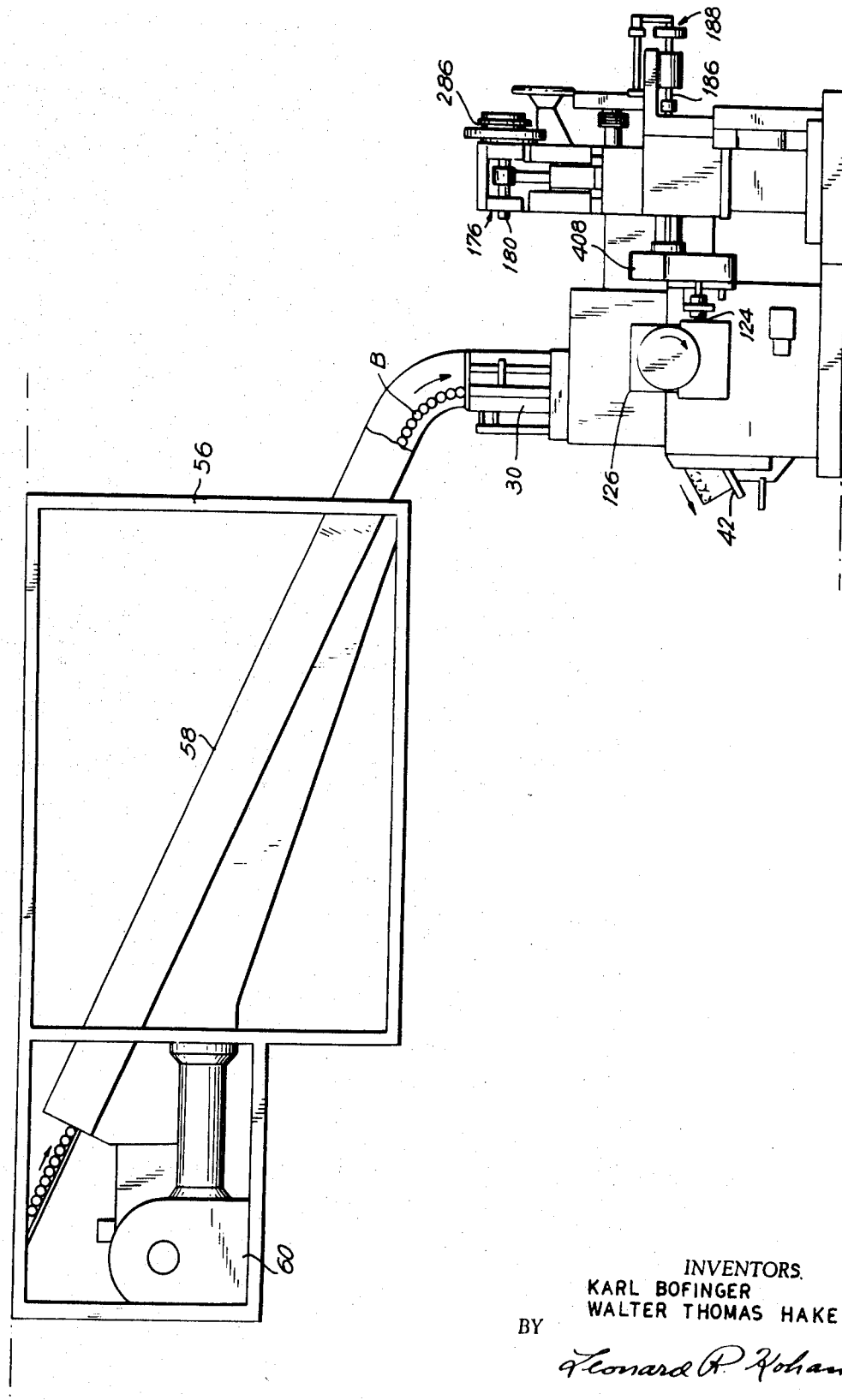
FIG. 2 is an elevational view of a strip forming and applying machine embodying the apparatus shown schematically in FIG. 1 and also showing an oven for heating the container bodies preparatory to their entry into the machine proper.

Prior to the introduction of the bodies B into the machine proper, heating means may be provided to heat the container bodies B to facilitate adhesion of the strips S thereto. Exemplary heating means, shown in FIG. 2, comprise an oven 56, an inclined chute 58 passing through the oven, a source of heat for the oven (not shown), and circulating means such as the blower 60 to circulate the heat about the container bodies as the latter roll along the oven chute 58 to the worm conveyor 30. Heating of the container bodies may or may not be required, depending on various factors such as the ambient temperature, humidity, and characteristics of the adhesive, the strip, and the body.

Figure 4:
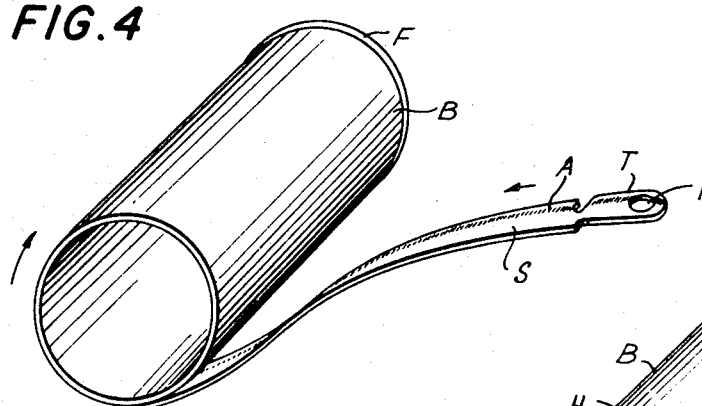
FIG. 4 is a perspective view of a tubular container body and a strip which is being applied thereto, the view being generally illustrative of the relationship of these parts just after the time of initial engagement between them.
Figure 5:
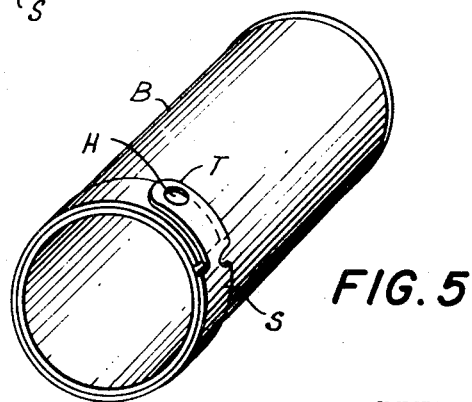
FIG. 5 is a perspecive view of a tubular container body on which the strip has been applied.
Figure 17:
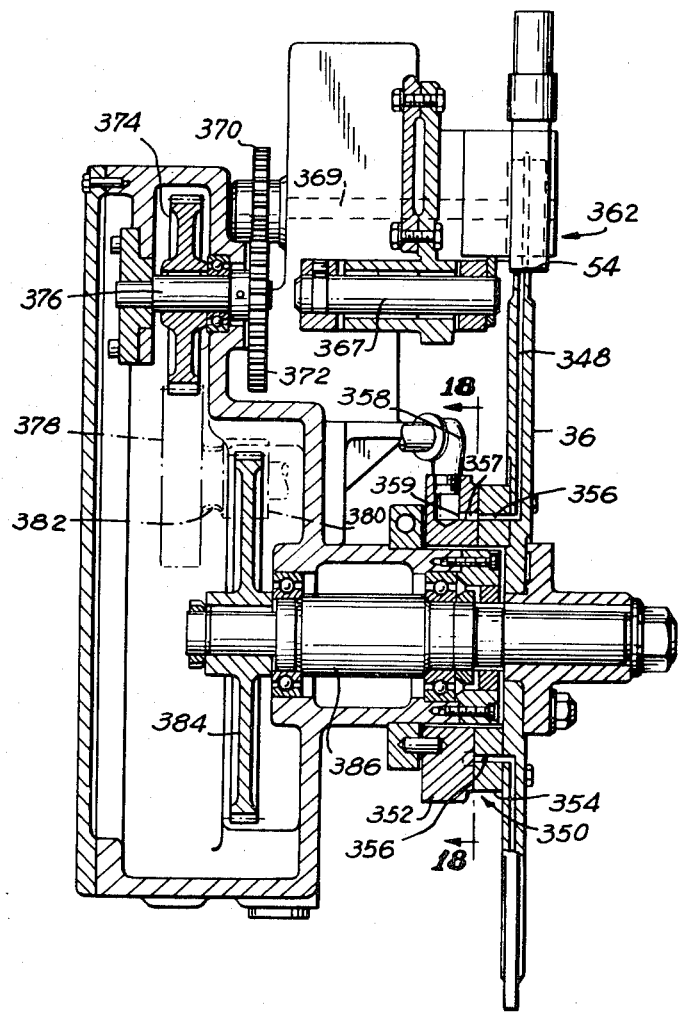
FIG. 17 is a sectional view through the vacuum wheel taken substantially along the line 17—17 of FIG. 7.
Figure 19:
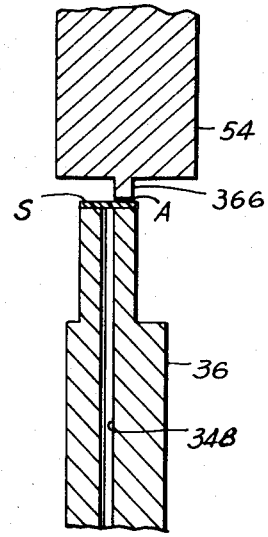
FIG. 19 is a fragmentary sectional detail of portions of the vacuum wheel and adhesive roll.

A perspective view of a finished container body B to which a strip S having a pull tab T has been applied by the machine and method of the instant invention is shown in FIG. 5. The perspective view of FIG. 4 shows the strip S partially applied to a body B and also shows the band of adhesive A which is applied by the adhesive roll 54 of FIGS. 17, 19, 20 and 21 as will be described in detail.

Turning to specific details of the illustrated embodiment and referring to FIG. 6, the worm conveyor 30 receives the bodies B from the chute 58 and feeds them to the feed turret 32. Guide rails 61, 62 provided adjacent the conveyor 30 and the feed turret 32, respectively, hold the container bodies in place as they are fed by the conveyor 30 and as they are transferred by the feed turret 32. The guide rail 62 supports the bodies in the pockets 63 of the feed turret 32 until they pass into the pockets 64 of the applicator turret 34 where the guide rails 62 terminate and guide rails 65 assume the control of the bodies as the latter are carried by the applicator turret 34.

The applicator turret spindle pairs 38 and 39 are operable to rotate each container body to wrap a strip S thereon and also to form a flange on one longitudinal end of the container body.

As shown in FIGS. 8 to 10, the applicator turret 34 comprises a pair of longitudinally spaced support plates 66 and 67 suitably secured to a sleeve 68 which is keyed to and rotatable with applicator turret shaft 69. The peripheries of the plates 66, 67 are suitably notched to provide a group of eight body receiving pockets 64 in the applicator turret. The sleeve 68 has a pair of spaced end flanges 70 and 71 (FIG. 8), each of which is formed with a plurality of evenly spaced openings in each of which is mounted a bushing 72. The bushings 72 in the flanges 70, 71 are longitudinally aligned to form opposed pairs and each pair slidably mounts a pair of spindle assemblies 38, 39 which engage the ends of container bodies to rotate them on their axes as previously mentioned. In the illustrated embodiment, there are eight longitudinally aligned pairs of spindle assemblies 38, 39, there being one pair provided for each pocket 64.

Each spindle assembly includes a slide member 74 slidably mounted in its respective bushing 72 and keyed therein against rotation. Each of the slide members 74 also includes a tail piece 76 which projects outwardly beyond the adjacent spindle flange. Each tail piece 76 has mounted on it a pair of spaced rollers or cam followers 80 which straddle a fixed annular cam 82 which is mounted on a web 81 of the machine housing 82 by bolts 83. The surfaces of the cam 82 engaged by the followers 80 is so shaped that upon rotation of the applicator turret 34, the cam 82 engages the followers 80 to slide the slide members 74 axially back and forth within the bushings 72.

The slide members 74 each carry within them a spindle shaft 86 which is mounted for rotation relative to the slide member on spaced bearings 87, 88. At their outer ends, the spindle shafts 86 each carry a spindle gear 90. At their inner ends, those spindle shafts 86 which are mounted on the flange 70 carry support heads 92 while those mounted on the flange 71 carry flanging heads 94.

In the illustrated embodiment, the heads 92 and 94 enter into and support the ends of the container body B, the heads 94 also being formed with a flanging surface which is adapted to form a flange F on one end of each container body B, the flange normally being formed on the end of the body which does not have a strip S applied to it. The reason for providing a flange is to make it possible to secure the bottom end closure to the body by means of a double seam, an example of such a seam being disclosed in U.S. Pat. No. 2,633,095. Since this type of seam is not usually desired at the top end of the container, the top of the body is not normally flanged. The flanging operation is conventional, and accordingly, will not be described in detail.

The flanging heads 94, the support heads 92, the spindle shafts 86 on which the heads are mounted, and the slide members 74 which carry the spindle shafts 86 are axially slidable, by virtue of the shape of the cam 82, to insert the heads 92, 94 into the open ends of the container bodies B as soon as possible after the bodies are received in the transfer turret 34.

The spindle gears 90 on the spindle shafts 86 mesh with and are rotated by a pair of large spur gears 96 which are concentric with the shaft 69. In order to provide for adjustable control of the speed of rotation of the gears 90, the spur gears 96 are mounted on the inner ends of a pair of hollow spindle drive shafts 98 which are rotatably mounted on bearings 102, 103 carried by the applicator turret shaft 69. The spindle gears 90 are of sufficient width so they may be slid axially by the full throw of the cam 82 without coming out of mesh with the spindle drive gears 96. At their outer ends, the spindle drive shafts 98 carry gears 100 which are in turn driven, via idler gears 101, by gears 104 keyed to a shaft 105. The shaft 105 in turn is driven through a gear train indicated generally at 106 from the output shaft 108 of a variable speed drive 110.

It will be apparent that the rotation of the gears 90 (and consequently of the spindle heads 92, 94) is due both to the revolution of the gears 90 around the shaft 69 and by the fact that the spur gears 96 rotate at a speed different from the speed of rotation of the shaft 69. Thus, the desired speed of rotation of the heads 92, 94 can be readily obtained by adjusting the output of the variable speed drive 110 to thereby obtain the necessary relationship between the rotational speeds of the shaft 69 and the gears 96.

From the above description it will be apparent that the heads 92, 94 rotate on their axes, and that they are also movable axially by the cams 82 and cam followers 80, as the applicator turret shaft 69 is rotated by means to be hereinafter described.

The applicator turret shaft 69 at one end carries a gear 120 which is driven by worm gear 122 on shaft 124, the gears 120 and 122 being positioned within a gear box 126 affixed to the housing 82 (see FIG. 8). A spur gear 128 which is keyed to applicator turret shaft 69 drives the feed turret 32 through gear 130 on feed turret shaft 132, the latter shaft 132 in turn mounting a gear 134 which drives the spiral feed worm conveyor 30 through idler gear 135, gear 136, shaft 138, sprocket 140, chain 142 and sprocket 143 (the latter sprocket being shown only in FIG. 6). Although not shown in FIG. 8 but represented schematically in FIG. 22, the applicator turret shaft 69 also drives the discharge turret 40 and the variable speed drive 110 (previously mentioned). To this end, the previously mentioned gear 128 on applicator turret shaft 69 drives a gear 144 on discharge turret shaft 146, said gear 144 in turn driving a gear 148 on the input shaft 150 of the variable speed drive 110.

As previously mentioned, each container body B, as it is carried on the applicator turret 34 and rotated by the spindles 38, 39 has a seam release strip S applied to it. To assist in the application of the strip S, a freely rotatable pressure roller 156 (FIGS. 9 and 10) is pivotally mounted on the support plate 66 adjacent each body receiving pocket 64 of the applicator turret 34 and is adapted to roll the strip S into intimate contact with the body B as the strip S is stripped off the vacuum wheel 36 by the rotating body B. The rollers 156 preferably have an outer covering of resilient material 160 (e.g. rubber), see FIG. 10, and are rotatably carried on crank arms 162, the latter being pivotally mounted on the applicator turret support plate 66 on pins 164. The turret support plate 66 also carries brackets 166 which support biasing means in the form of springs 168 which engage the crank arms 162 and urge the rollers 156 towards the body B, a stop comprising an adjustable threaded member 170 in crank arm 162 and abutting the adjacent bracket 166 being provided to position the roller 156 so that it is barely in substantially tangential contact with the container body B, prior to the time the strip S is applied thereto. As the body B rotates by the spindle assemblies 38, 39, pulls its strip S from the vacuum wheel 36 the roller 156 engages the strip S and slightly compresses the spring 168, whereby the roller 156 is rotated by such engagement and presses the strip S against the container body under spring pressure, as can readily be seen in FIG. 9.

The spindle assemblies 38, 39 are rotated at a suitable speed of rotation so that by the time a body B moves from a position adjacent the vacuum wheel 36, where the strip S is initially engaged and picked up, until the body with its applied strip S is transferred to the discharge turret 40, the container body is rotated at least once through a sufficient number of turns to insure that the full length of the strip S (including the pull tab T) is pressed against the body B. The speed of rotation of the spindle assemblies 38, 39, as has been explained, variable as determined by adjustment of the variable speed drive 110 already mentioned.

The cams 82 (FIG. 8) are operable to insert the heads 92, 94 into the ends of the container bodies just after the latter have been transferred to the applicator turret 34 and to withdraw them just before transfer to the discharge turret 40. Suitable means, e.g. stripper rails 172 (FIG. 6), are provided to facilitate the transfer of the container bodies from the applicator turret 34 to the discharge turret 40 and from the latter to the discharge chute 42.

Having described the path of travel and the apparatus for handling the container bodies, a description of the strip formation and feed will now be set forth.

A web of strip material M having a width equal to the ultimate length of the strip S is fed from a supply coil 44 (FIGS. 1 and 12) by the feed rolls 46 to a press which includes a cutting member 48 which shears off end portions of the web M to form the individual strips S. The material M may be of any type suitable for use as a seam release strip. One desired material has been found to be high density polyethylene, but other materials may also be used.

Referring to FIGS. 11 to 13, the apparatus for forming the strips S from the web M comprises a press, indicated generally as 176, having a frame 178 at the upper end of which is rotatably mounted a crank shaft 180 (see also FIG. 7), the latter driving a crank rod 182 which reciprocates a cutter support block 184 (FIGS. 11 and 12) in a conventional manner. The cutter support block 184 has mounted in it the cutting member 48, previously described (see FIG. 1, for example) which severs the strip S from the supply material M.

The drive for the feed rolls 46 is taken off a transverse shaft 186 (FIGS. 11 and 12) which drives an eccentric mechanism indicated generally at 188. The drive for the transverse shaft 186 and also for the press crank shaft 180 will be described later. The eccentric mechanism 188 includes an eccentric pin 190 on which a rod 192 is rotatably mounted, the rod 192 in turn pivoting a crank arm arrangement including levers 194 and 196 mounted on shaft 198 (see also FIG. 7). The position of the eccentric pin 190 relative to the center line of transverse shaft 186 may be varied by adjusting the threaded member 200, thereby providing for adjustment of the amount of back and forth pivotal movement of crank lever 196. The crank lever 196 is pivotally connected to and reciprocates a rod 202, the latter in turn driving a ratchet drive mechanism indicated at 204.

The ratchet mechanism 204 includes a ratchet wheel 206 (FIG. 12) and one or more spring biased pawls 208, the pawls 208 being mounted on a ring 210 which is secured to and rotated back and forth by the previously mentioned reciprocating rod 202 by means of the pivotal connection between the ratchet ring lug 212 and rod 202 as will be evident in FIG. 12. The ratchet wheel 206 is keyed to a shaft 214, while the ring 210 is freely mounted on shaft 214. The shaft 214 also has keyed to it the lower feed roll 46 (see also FIG. 7). A drag brake 216 (FIG. 7) which includes a friction lining, is provided on the shaft 214 so that a positive force is always required to rotate the shaft 214, thereby insuring against undesired rotation of shaft 214, for example, during the return stroke of ratchet mechanism 204. It will be apparent that the above described apparatus is operable to periodically rotate the lower feed roll 46 step-by-step through the ratchet mechanism 204 as the transverse shaft 186 is continuously rotated by means to be described.

The upper feed roll 46 which is mounted on a shaft 218 is driven in time with the lower feed roll 46 by way of the meshing spur gears 220 and 222 mounted on shafts 218 and 214 respectively. The upper roll shaft 18 is mounted at its opposite ends in bearing supports 224 (FIG. 12) (only one shown) having sections which are slidable up and down in slide openings 226 (only one shown) formed in the machine frame. A biasing means in the form of a coil spring 228 normally urges the upper roll 46 towards the lower roll 46.

In order that the feed rolls 46 may release their grip on the material M, means are provided to lift the upper roll 46 against the bias of spring 228. This lifting means comprises a pair of lifting levers 230 (only one shown, see FIGS. 12 and 13) pivoted on pivot pins 232 secured to the machine frame. Each lifting lever 230 has a projecting finger 234 engaging a reduced diameter shoulder or groove 236 located at the longitudinal end portions of the upper feed roll 46. A cross bar 238 extending parallel to the longitudinal axes of the rolls 46 joins the two lifting levers 230 (only one shown). The reciprocal press cutter support block 184, previously described, carries an actuating member 240 which is adapted to contact the cross bar 238 on the downward stroke of the press and pivot the lifting levers 230 clockwise (as viewed in FIGS. 12 and 13) about pivots 232 to the broken line position of FIG. 13 to lift the upper roll 46. The amount of lift is relatively small enough to free the web material M from between the rolls 46 but not enough to take the roll gears 220 and 222 out of mesh.

In order to prevent the material M from shifting or moving to the left, as seen in FIG. 12, i.e. towards the supply coil 44 when the upper roll 46 is lifted, check means are provided to engage the web M. As best shown in FIG. 12, the check means comprise one or more check or drag bars 246 pivotally mounted on a rod 248, which in turn is supported on the machine frame by uprights 250 (only one shown). The check bar 246 is mounted for free gravity actuation and it will be apparent from FIG. 12, that the web M may be freely moved to the right underneath the check bar 246 while movement to the left, towards the supply coil 44 is prevented because the web M will be wedged between the sharp bottom corner of the check bar 246 and the support plate 252. Without a check arrangement, the tendency would be for the material M to move to the left due to its own weight and any tension therein when the rolls 46 release the material.

The upper feed roll 46 is lifted at the bottom of each stroke of the press. Accordingly, with each such stroke, the material M is allowed to find its relaxed position in the area of the feed rolls 46. Allowing the material M to find its relaxed position in this manner prevents uneven feed and tends to prevent the feeding of one transverse side faster than the other so that the coil goes askew.

Operating in conjunction with the roll feed mechanism is a latch-out mechanism, indicated generally 256 (FIG. 12) which is operable to hold the upper feed roll 46 in its raised position to prevent further feed of the web material M under certain circumstances. The latch-out mechanism 256 comprises a latching lever 258 pivotally supported on the machine frame at 260. A normally non-energized solenoid coil 262 also mounted on the machine frame has a spring biased plunger 264 adapted to normally hold the latching lever 258 in its retracted, non-operative position shown in full lines in FIG. 12. In this position (FIG. 12), the latching lever 258 is free of the cross bar 238, and the lifting levers 230 are free to be repeatedly pivotally actuated by the press actuating member 240. In the right hand, operative position of the latching lever 258 (shown in dot and dash lines in FIG. 12), a notch 266 in the lower end thereof engages a corner of the cross bar 238, after the latter has been moved to its lower position by the press actuating member 240, thereby to hold the lifting fingers 234 in raised position to thereby maintain the upper roll 46 inoperative.

Thus, it will be apparent that the latch-out mechanism 256 is operable to prevent feeding of the material when the latching lever 258 has been pivoted to the right-hand dot and dash line position shown in FIG. 12. It will also be apparent that the press 176 can continue to reciprocate even though the material M is not being fed so that it is not necessary to stop the press and other operating parts of the machine when the web feed has been temporarily stopped. The solenoid coil 262 may be actuated in response to operating conditions at any part of the machine. For example, the solenoid coil 262 may be actuated to prevent feed of material upon detection, by the photoelectric cell 268 (FIG. 1), of the absence of a container body B in one of the pockets of the feed turret 32 whereby a strip S will not be cut by the press for the absent container body.

It will be evident from the above description that the amount of web material fed during a stroke of the machine may be adjusted by turning the screw 200 (FIGS. 11 and 12) to adjust the eccentric mechanism 188. Also, the feed arrangement, by allowing the material M to find a relaxed position as the upper feed roll 46 is lifted, tends to prevent uneven feeding of the material. Further, the arrangement also facilitates temporary or momentary stopping of the web feed without having to stop the heavy press and other operating mechanisms of the machine.

Figure 3:
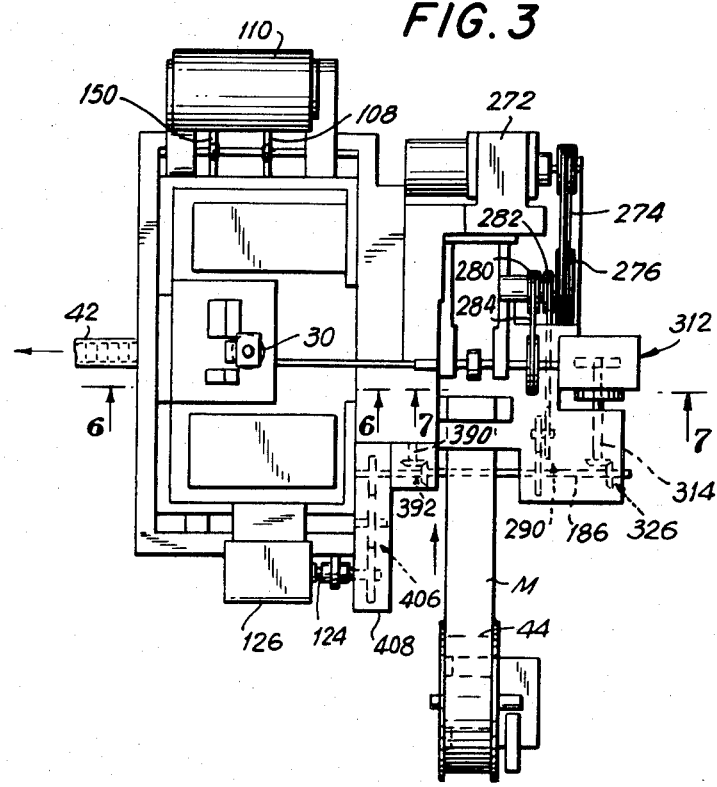
FIG. 3 is a plan view of the strip forming and applying machine shown in FIG. 2.

Referring particularly to FIGS. 3, 11 and 22, the drive for the press 176, the feed rolls 46, and the various other operating mechanisms of the machine are obtained from a drive motor 272 mounted on the side of the press frame 178. The motor 272 drives belts 274 which in turn drive a pulley 276 mounted on shaft 278. The shaft 278 in turn mounts two additional pulleys 280 and 282, one (280) of which drives a belt 284 which in turn drives the pulley 286 mounted on the press crank shaft 180, previously described, and the other (282) of which drives the belt 288 which in turn drives the previously described transverse shaft 186 through a pulley and gear train indicated generally at 290 (FIGS. 11 and 22). As previously described, the eccentric mechanism 188 for driving the feed rolls 46 is driven off of transverse shaft 186. Thus, the motor 272 drives the press 176 and also the transverse shaft 186 which in turn drives the feed rolls 46. As will be further described hereinafter, the drives for various other mechanism of the instant machine are taken off the transverse shaft 186.

As shown in FIGS. 4 and 5, the strip S preferably has a hole H punched in one end portion to facilitate gripping. Also, one end section of the strip S is slightly offset from the remainder of the strip to prevent it from being included in the end seam of the finished container. The offset portion forms a pull tab T which facilitates removal of the strip S by the ultimate user of the container. Accordingly, the press 176 includes progressive dies adapted to form the strip S in the pattern shown in FIGS. 4 and 5. Of course, various other strip configurations may be formed as may be desired by using suitable dies. The progressive dies will not be described in detail as it is believed the design of such dies will be apparent to those skilled in the art.

However, it will be observed that the press reciprocating cutter support block 184, previously described, in addition to carrying the cutting member 48 which severs the strip S from the material M, also carries the other cutting or punching elements necessary to produce the strip configuration shown. These elements include a punch 292 (FIG. 12) for making the hole H in the strip S and may, if desired, also include an embossing die (not shown) for embossing the pull tab T to facilitate gripping. The stations in the lower half of the progressive dies are indicated generally at 294 in FIG. 15.

Referring particularly to FIGS. 14–16, the strip S, upon being severed by the cutting member 48, is pushed downwardly (see FIG. 16) onto the underlying reciprocally mounted transfer bar 50 which is formed with a channel 302 in which the strip S is received. The transfer bar 50 is also formed with a plurality of vacuum passages 304 opening to the channel 302 to hold the strip S in place on the bar 50. A suitable source of vacuum (not shown) may be connected to the passages 304 via a flexible conduit 307 and an internal bore 306 which is formed in the bar 50. After a strip S has been severed by the cutting member 48 and passes to the transfer bar 50, the latter is reciprocated to feed the strip longitudinally to a pair of pinch rolls 52 (FIGS. 1, 7, 20), which in turn feed it to the vacuum wheel 36 as will be further described.

As shown in FIG. 14, the leading end of the strip, which is its non-offset end, extends beyond the end of the transfer bar 50, the arrangement being such that when the transfer bar 50 is reciprocated to a forward feed position, the pinch rolls 52 can readily grasp the free leading end of the strip S to pull it off of the transfer bar 50. Depending on the particular configuration of the strip S, a plate 310 having a sloping rear surface 312 may be secured to the forward end of the transfer bar 50 to lift the tab T of strip S out of the channel 302 as the strip S is pulled from the transfer bar 50 by the pinch rolls 52. The vacuum in the transfer bar 50 may be shut off and the passages 304 vented to the atmosphere at the end of each feed stroke of the bar 50 by suitable means (not shown) to facilitate stripping of the strip S from the bar, but it has been found that this is not normally necessary because the strip S can be slid easily off the bar even with the vacuum on.

The reciprocal movement of the transfer bar 50 is effected by an eccentric drive mechanism indicated generally at 312 and shown in FIGS. 7, 15, and 22. Referring particularly to FIG. 7, a shaft 314 rotates an eccentric pin 316 which in turn pivots a lever 318 back and forth about a stationary pivot support 320. The upper end of lever 318 is pivotally mounted to a connecting slide member 322 which is attached to the transfer bar 50 at the posts 324 (FIGS. 14 and 15). It will be apparent that shaft 314 is operable to reciprocate the transfer bar 50 forward and back each time the latter receives a strip to thereby feed the strip to the pinch rolls 52 which in turn feeds it to the vacuum wheel 36 as will be further described. The mechanism accelerates the strip from zero to synchonous speed with the vacuum wheel 36. The transfer bar drive shaft 314 is driven by the previously described transverse shaft 186 through the right-angle gear drive indicated at 326 in FIGS. 3, 7, and 22.

The pinch rolls 52 which receive the strip S from the transfer bar 50 are adapted to be alternately separated and closed, closing being effected when the strip S carried on the transfer bar 50 has reached a proper velocity. The opening and closing is brought about by lowering and raising the lower pinch roll 52, actuation being effected by a cam 330 (FIG. 20), which is keyed to a shaft 332 which drives a hold-down guide roll 334.

The hold-down guide roll 334 has an annular groove 335 formed in its outer periphery in which the peripheral edge of the vacuum wheel 36 is received. Thus, the hold-down roll 334 is operable to guide the strip S and to hold it against the outer periphery of vacuum wheel 36 as the strip is fed therebetween by the pinch rolls 52.

The lower pinch roll 52 is carried on a bracket 336 which is pivoted on the machine frame about the pivot shaft 338. The pivotal bracket 336 carries a cam follower roll 340 which rides on the periphery of cam 330. A spring 342 urges the pivotal bracket 336 counter-clockwise (FIG. 20) so that the cam follower 340 is urged against the cam 330 to follow the contour of the latter.

It will be apparent that the high surface of cam 330 will pivot the bracket 336 clockwise against the bias of spring 342 to lower the lower pinch roll 52 to an open position while the low surface of cam 330 will allow the spring 342 to pivot the structure 336 in an opposite direction to raise the lower pinch roll 52 into closed position. The closed position of the pinch rolls 52 may be adjusted by turning a screw 344 which abuts the upper end of the bracket 336 as shown in FIG. 20.

A side section of the peripheral groove defining portion of the hold-down wheel 334 may be cut away, as indicated at 346 in FIG. 20, in order to provide for accommodation of the tab T on the strip S as the latter is engaged by the hold-down roll 334. It will be understood that the roll 334 makes one revolution for each stroke of the cutting press so that the strips S are timed into the roll 334.

Referring to FIGS. 17–20, the vacuum wheel 36 is formed with six groups of radial passages 348 which open its outer peripheral surface. These radial passages 348 are brought into communication with a source of reduced pressure or vacuum through a rotary valve 350 and each group of passages 348 functions to hold one of the strips S on the vacuum wheel until it is brought into contact with a body B.

Figure 18:
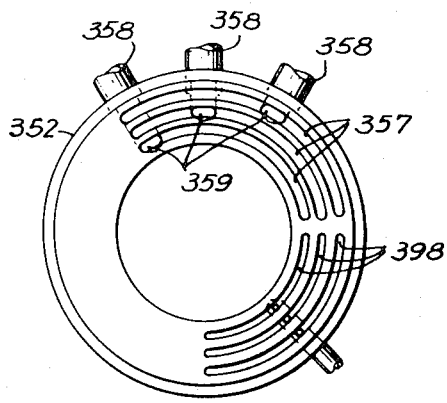
FIG. 18 is a sectional detail through the vacuum wheel valve taken substantially along the line 18—18 in FIG. 17.

The rotary valve 350 (see FIGS. 17, 18 and 20) comprises a stationary ring 352 which is secured to the machine frame and a rotating ring 354 which is secured to one side of the vacuum wheel 36 and has formed in it a plurality of horizontal ports 356 which are in alignment with the inner ends of the passages 348 and form continuations thereof. The stationary ring 352 is provided with three concentric arcuate vacuum groove segments 357, each of which is connected to a source of vacuum (not shown) through a pipe 358 which communicates with a vacuum port 359 which opens into the segment 357. As best seen in FIGS. 18 and 20, the horizontal ports 356 of adjacent groups of passages 348 are offset so that not more than one group of ports 356 is ever in communication with a given segment 357 at any one time. As a result of this construction, vacuum is applied to the radial passages 348 along a sector of the vacuum wheel 36 extending from a point approximately at which the strip S initially contacts the vacuum wheel 36 to a point where they initially engage the container bodies B.

As each strip S is carried on the vacuum wheel 36, an adhesive applicator mechanism, indicated generally at 362 (FIGS. 17, 20 and 21), applies a band or strip of a suitable adhesive A, which preferably is of a thermoplastic type having low-peel strength characteristics, to the strip. The adhesive applicator 362 may be of any suitable type and accordingly, is not described in great detail. The applicator mechanism 362 shown in the drawing includes an adhesive applying roll 54 which has a narrow annular peripheral extension or ring 366 which applies the adhesive band A along the full longitudinal length of the strip S, including the tab T and preferably in an area which is disposed adjacent that edge of the strip S which is to be farthest removed from the edge of the adjacent edge of the body B to which the strip S is applied (see FIG. 4).

The adhesive applicator mechanism 362 also includes a housing 363 which is internally chambered to provide a reservoir 364 which is disposed on one side of the adhesive roll 54 and maintains a supply of molten adhesive A in contact with a sector of the roll 54 as shown in FIG. 20. The bottom plate 365 of the housing 363 is cut away so that the bottom portion of the roll 54 protrudes through it, the fit between all portions of the bottom plate 365 and the wheel 54 being sufficiently snug to form an adhesive-tight seal except for the spaces 373 and 371 immediately radially outwardly of the ring 366. The space 373 is spaced away from the periphery of the ring 366 a sufficient distance to permit the desired thickness of adhesive A to remain on the ring surface for application to the strip S. The space 371, similar to space 373, is located at the point where the periphery of the roll 54 passes upwardly past the bottom plate 365. Thus, when adhesive is not deposited on a strip S, as for example when the adhesive applicator mechanism 362 is pivoted to an inoperative position as will be described, such adhesive will be returned to the reservoir 364. Preferably, the thickness of the adhesive band A is sufficient so that the ring 366 need not actually contact the strip S in order to deposit the adhesive on it. The adhesive may be fed into the reservoir 364 in any siutable manner or form, either automatically or manually. One desirable way is to feed it automatically in solid ribbon form through an opening formed in the top wall of the housing 363, suitable control devices being utilized in the reservoir to feed the adhesive as desired to maintain a constant adhesive level. Suitable temperature control devices are also provided to maintain the adhesive in the reservoir at the desired temperature.

The mechanism 362 is preferably mounted on a bracket 367 which in turn is pivotally mounted on a pivot pin 368. As a result of this mounting, the applicator wheel 54 may be pivotally moved upwardly away from the vacuum wheel 36 to a non-operative position, as is desirable in the event that the machine is temporarily stopped or when it is being set up for operation or servicing. Pivotal movement of the bracket 367 may be effected manually, or automatically as by a solenoid 375, the armature of which is connected to one end of the bracket 367.

The adhesive applicator roll 54 is driven by a shaft 369 (FIG. 17) mounting a spur gear 370, the latter in turn being driven by a gear train arrangement which includes gears 372 and 374 mounted on a shaft 376, and gears 378 and 380 mounted on another shaft 382, said latter gear (380) being driven by gear 384 carried on the vacuum wheel shaft 386. The gear 384, in turn, meshes with a gear 388 (FIG. 22) on shaft 390, the latter being driven through a right-angle drive 392 by the previously described transverse shaft 186. It will also be observed that the hold-down roll shaft 332 drives the hold-down roll 334 and also drives the pinch rolls 52 through the gear train, indicated generally at 396, as will be evident in FIG. 22.

After the molten thermoplastic adhesive band A has been thus applied to the strip S, the latter is carried by the vacuum wheel 36 into tangential contact with one longitudinal end of the rotating container body at an area which may be termed a transfer station. This occurs at about the point where the vacuum wheel 36 and the applicator wheel 34 come into substantial tangency, or to put it another way, where the paths of travel of the strip and the body come into tangency. Because of the tackiness of the adhesive A, the strip S adheres immediately to the container body and is stripped off the vacuum wheel 36 by the rotating body B as the latter moves away from the vacuum wheel 36. To permit this stripping, the vacuum groove segments 357 terminate at the transfer point and three venting groove segments 398 (FIG. 18), which are concentrically aligned with the vacuum groove segments 357 are provided. These venting segments 398 may communicate with the external atmosphere, or if desired, may be connected to a source of positive air pressure to positively break the vacuum in the passages 348 and thus facilitate removal of the strips S from the vacuum wheel 36.

As each strip S is thus stripped from the wheel 36, it is rolled onto the rotating body B with the aid of the roller 156, the latter firmly pressing the strip onto the container body B and aiding in positioning the strip S thereon with proper tolerances and close to one longitudinal end of the body. The position of the strip after it has just been picked up by body B is shown at 400 in FIG. 9, a partially rolled strip at 402, and a completely rolled strip at 404. It will be noted that the pull tab T overlaps the opposed end of the strip S and is adhesively secured to it by virtue of the fact that the adhesive band A extends for the full length of the strip S.

In order that the outer surface of the rotating container body B will be moving at substantially the same speed as the strip S as the latter is being carried on the vacuum wheel 36 at the time of transfer, the sum of the surface speed of revolution of each container body B around the shaft 69 and its surface speed of rotation about its own axis, should substantially equal the peripheral speed of the vacuum wheel 36. It may, under some circumstances, be desirable to have the surface speed of the body B slightly exceed that of the vacuum wheel 36 in order to apply slight tension to the strip S. There is little danger of breaking the strip S when this is done since it will slide to some extent around the periphery of the wheel 36 despite the vacuum therein. The most desirable speed of the body B may readily be obtained by adjustment of the variable speed drive 110. As seen in FIG. 9, the trailing end portion of the strip S will be stripped from the vacuum wheel 36 prior to the time it is wound onto the body B. To insure control of this trailing end portion, a guide bar 406 is provided to hold it in concentricity with the strip applicator turret 34.

After the strip S has thus been wrapped around the container body B, the body is transferred to the discharge turret 40 which in turn passes it to the discharge chute 42. By the time the body B is discharged from the turret 34, the adhesive A of its strip S, which adhesive has been squeezed thin by pressure of the roller 156, has set sufficiently to bond the strip S to the body B.

It will be observed in the schematic drawing in FIG. 22, which for the most part has already been described, that the drives for the various operating mechanisms are taken off the drive motor 272. Thus, the drive motor 272 drives the press 176 and the transverse shaft 186, the latter in turn having various take-offs for driving the vacuum wheel 36, adhesive roll 54, hold-down roll 334, pinch rolls 52, transfer bar 50, and feed rolls 46. The transverse shaft 186 also drives the shaft 124 through a gear train, indicated generally at 406, included within a gear box 408 (see also FIG. 3). The shaft 124, as previously described, drives the feed turret 32, discharge turret 40, spiral feed conveyor 30 and the input shaft 150 to the variable speed drive 110, the latter driving the spindle assemblies 38, 39.

The above described apparatus may be adapted to handle other size container bodies or other configurations of strips. When handling larger size bodies, the rotational speed of the spindle assemblies 38, 39 may be varied through the variable speed drive 110. Variations in spindle speed may, of course, be effected independently of the speeds of the various other driven parts.

As an alternative embodiment, other types of adhesive, as for example pressure sensitive or solvent types of adhesives may be utilized to adhere the strips to the container bodies. In such a case, the heating means employed to heat the adhesive may be omitted. Further, instead of applying the adhesive to the strip, it may be applied to the container body.

It is thought that the invention and many of its attendant advantages will be understood from the foregoing description and it will be apparent that various changes will be made in the form, construction, and arrangement of the parts without departing from the spirit and scope of the

We claim:

1. Apparatus for securing a strip member to a tubular body member, one of the members having an adhesive thereon so as to adhere to the other member upon contact therewith, comprising:
   carrying means for moving the tubular body member continuously along a first fixed path of revolution;
   spinning means for rotating the tubular body member about its own axis simultaneously as it is continuously moved along said first path; and
   feeding means for moving the strip member continuously along a second fixed path of revolution, counter to and tangential to said first path of revolution, to bring said strip member into contact with the outer periphery of said tubular body member, at the location of tangency of said first and second paths, simultaneously as said rotating tubular body member is moved along said first path in order that said strip member may be transferred to and secured around said rotating tubular body member.

2. Apparatus for securing strip members to tubular body members, one of the members having an adhesive thereon so as to adhere to the other member upon contact therewith, comprising:
   carrying means for successively moving a plurality of tubular body members continuously along a first fixed path of revolution;
   spinning means for successively rotating said plurality of tubular body members about their own axes simultaneously as they are continuously moved along said first path; and
   feeding means for successively moving a plurality of strip members continuously along a second fixed path of revolution counter to and tangential to said first path of revolution, to bring successive strip members into contact with the outer periphery of successive, rotating tubular body members, at the location of tangency of said first and second paths, simultaneously as successive rotating tubular body members are moved continuously along said first path, in order that successive strip members may be transferred to and secured around successive rotating tubular body members.

3. Apparatus for securing strip members to tubular body members, according to claim 2, further comprising:
   pressure means for engaging and pressing successive strip members onto successive rotating tubular body members as said rotating body members are moved along said first path in order that successive strip members may be secured around said rotating body members.

4. Apparatus for securing strip members to tubular body members, according to claim 3, wherein:
   said carrying means includes a rotatable turret; and
   said pressure means includes biased rollers which are mounted on said rotatable turret.

5. Apparatus for securing strip members to tubular body members, according to claim 2, wherein:
   said carrying means includes a rotatable turret; and
   said spinning means include rotatable spindle assemblies which are mounted on said rotatable turret and means for driving said spindle assemblies at variable speeds.

6. Apparatus for securing strip members to tubular body members, according to claim 2, wherein:
   said strip feeding means includes a feed wheel carrying strip members on a peripheral surface thereof, said feed wheel being so disposed relative to the first fixed path of revolution of the rotating tubular body members that leading portions of successive strip members are brought into tangential contact with successive rotating tubular body members.

7. Apparatus for securing strip members to tubular body members, according to claim 6, wherein:
   said carrying means include an applicator turret for moving said body members continuously along said first path of revolution; and
   means are provided for driving said applicator turret and said feed wheel so that the sum of the speed of revolution of the body members as they are moved by said applicator turret and the speed of rotation of the body members about their own axes is substantially equal to the peripheral speed of said feed wheel.

8. Apparatus for securing strip members to tubular body members, according to claim 2, wherein:
   said strip feeding means includes an adhesive applicator for applying a band of adhesive to the strip members before the latter are brought into contact with said tubular body members.

9. Apparatus for handling and securing strip members to tubular body members, comprising:
   a feed mechanism for moving a web of material along a longitudinal path;
   cutting means for transversely severing end sections of said web material to successively form strip members;
   a transfer bar for successively receiving strip members that have been severed from the web material and for successively moving them transversely of the longitudinal path of web feed;
   carrying means for successively moving a plurality of tubular body members continuously along a first fixed path of revolution;
   spinning means for successively rotating said plurality of tubular body members about their own axes simultaneously as they are moved along said first path;
   applicator means for applying an adhesive to one of said members in order that one will adhere to the other upon contact therewith; and
   feeding means for successively receiving the strip members from the transfer bar and for successively moving a plurality of strip members continuously along a second fixed path of revolution, counter to and tangential to said first path of revolution, to bring successive strip members into contact with the outer periphery of successive, rotating tubular body members, at the location of tangency of said first and second paths, simultaneously as successive, rotating tubular body members are moved continuously along said first path in order that successive strip members may be transferred to and secured around successive, rotating tubular body members.

10. Apparatus for handling and securing strip members to tubular body members, according to claim 9, wherein:
    said feed mechanism includes a pair of feed rolls for feeding the web material to said cutting means; and
    means are provided to alternately move said feed rolls between closed and open positions;
    said rolls in said closed position being operable to feed said web and in said open position allowing said web to assume a relaxed condition.

11. Apparatus for handling and securing strip members to tubular body members, according to claim 10, wherein:
    said feed mechanism includes check means engaging the web material to preclude reverse movement thereof when said feed rolls are in said open position.

12. Apparatus for handling and securing strip members to tubular body members, according to claim 10, further comprising:
    pinch rolls positioned between said transfer bar and said feeding means;
    means to alternately move at least one of said pinch rolls between closed and open positions;
    and actuating means for actuating said last named means to close said pinch rolls at a predetermined position of said transfer bar in order that the pinch rolls successively engage the moving strip members carried on the transfer bar and successively feed them to said feeding means.

13. Apparatus for handling and securing strip members to tubular body members, according to claim 12, further comprising:
a hold-down roll positioned adjacent said feeding means for successively engaging the strip members and facilitating their transfer to said feeding means, said hold-down roll being mounted on a shaft having a cam thereon for controlling said actuating means.

14. Apparatus for securing strip members to tubular body members, comprising:
means for delivering a supply of tubular body members;
a rotary applicator turret for receiving said body members from said delivery means;
spindle assemblies carried on said applicator turret, said spindle assemblies having rotating heads longitudinally movable between non-engaging and engaging positions whereby in the latter position they engage and rotate said tubular body members;
a feed wheel for delivering adhesive-coated strip members on a peripheral surface thereof;
means for continuously and opposite driving said applicator turret and said feed wheel so that the sum of the speed of revolution of the body members as they are carried on said applicator turret and the speed of rotation of the body members about their own axes is substantially equal to the peripheral speed of said feed wheel, said feed wheel being disposed relative to said applicator turret so that leading end sections of successive strip members carried on said feed wheel are brought into tangential contact with successive rotating tubular body members whereby the adhesive on said strip members adheres the end sections of said strip members to said body members;
roller means on said applicator turret positioned to engage and roll the strip members against the body members as the latter are rotated by said spindle assemblies in order that successive strip members may be transferred to and secured around successive rotating body members; and
means for discharging said body members from said applicator turret.

15. Apparatus for securing strip members to tubular body members, comprising:
means for delivering a supply of tubular body members;
an applicator turret for receiving said body members;
spindle assemblies carried on said applicator turret, said spindle assemblies having rotating heads longitudinally movable from a non-engaging to an engaging position, said rotating heads in said latter position engaging and rotating said body members;
cam means for effecting said longitudinal movement of said rotating heads;
a feed wheel for delivering strip members on a peripheral surface thereof, said feed wheel having passages for connecting a source of vacuum to the outer periphery thereof to thereby facilitate adherence of the strip members to said outer periphery;
adhesive applicator means for applying adhesive to the strip members as the latter are carried on said feed wheel, said adhesive applicator means including an adhesive roll having an annular peripheral surface which applies a band of adhesive to the strip members narrower than the width of the strip members;
means for continuously and opposite driving said applicator turret and feed wheel so that said feed wheel brings successive strip members into tangential contact with successive rotating tubular body members carried on said applicator turret, whereby the adhesive band on said strip members adheres said strip members to said tubular body members;
roller means on said applicator turret positioned to engage and pressure roll said strip members against said tubular body members as the latter are rotated by said spindle assemblies in order that successive strip members may be transferred to and secured around successive rotating body members; and
means for delivering said tubular body members from said applicator turret to a discharge area.

16. Apparatus for securing strip members to tubular body members, according to claim 15, further comprising:
means for heating said supply of tubular body members.

17. Apparatus for securing strip members to tubular body members, according to claim 15, further comprising:
vacuum control means including a rotary valve having a rotating and a stationary ring, said rotating ring having a plurality of ports forming continuations of said feed wheel passages, said stationary ring having an arcuate groove segment communicating with said source of vacuum and adapted to transmit said vacuum to said ports and said feed wheel passages along a predetermined sector of said feed wheel.

18. Apparatus for securing strip members to tubular body members, according to claim 17, further comprising:
means for breaking said vacuum in said passages to permit said strip members to be successively removed from said feed wheel.

References Cited
UNITED STATES PATENTS

| | | | |
|---|---|---|---|
| 3,404,059 | 10/1968 | Ritterhoff | 156—567 X |
| 3,231,445 | 1/1966 | Pezzoli | 156—567 X |
| 3,264,918 | 8/1966 | Lockhart | 83—160 |
| 3,341,390 | 9/1967 | Kirk | 156—528 X |
| 3,475,243 | 10/1969 | Scalora | 156—322 X |
| 3,562,050 | 2/1971 | Hake et al. | 156—215 |
| 3,555,764 | 1/1971 | Dowling | 156—568 X |

BENJAMIN A. BORCHELT, Primary Examiner

J. M. HANLEY, Assistant Examiner

U.S. Cl. X.R.

156—215, 448